INVENTOR.
LESLIE E. SODERQUIST
BY Ely, Frye & Hamilton
ATTORNEYS

INVENTOR.
LESLIE E. SODERQUIST
BY
ATTORNEYS

May 6, 1958

L. E. SODERQUIST 2,832,992

MECHANISM FOR REMOVING CURED TIRES FROM
TIRE CURING PRESSES

Filed May 17, 1956

*INVENTOR.*
LESLIE E. SODERQUIST
BY Ely, Frye & Hamilton
ATTORNEYS

May 6, 1958 L. E. SODERQUIST 2,832,992
MECHANISM FOR REMOVING CURED TIRES FROM
TIRE CURING PRESSES
Filed May 17, 1956 7 Sheets-Sheet 4

INVENTOR.
LESLIE E.
SODERQUIST
BY
Ely, Frye & Hamilton
ATTORNEYS

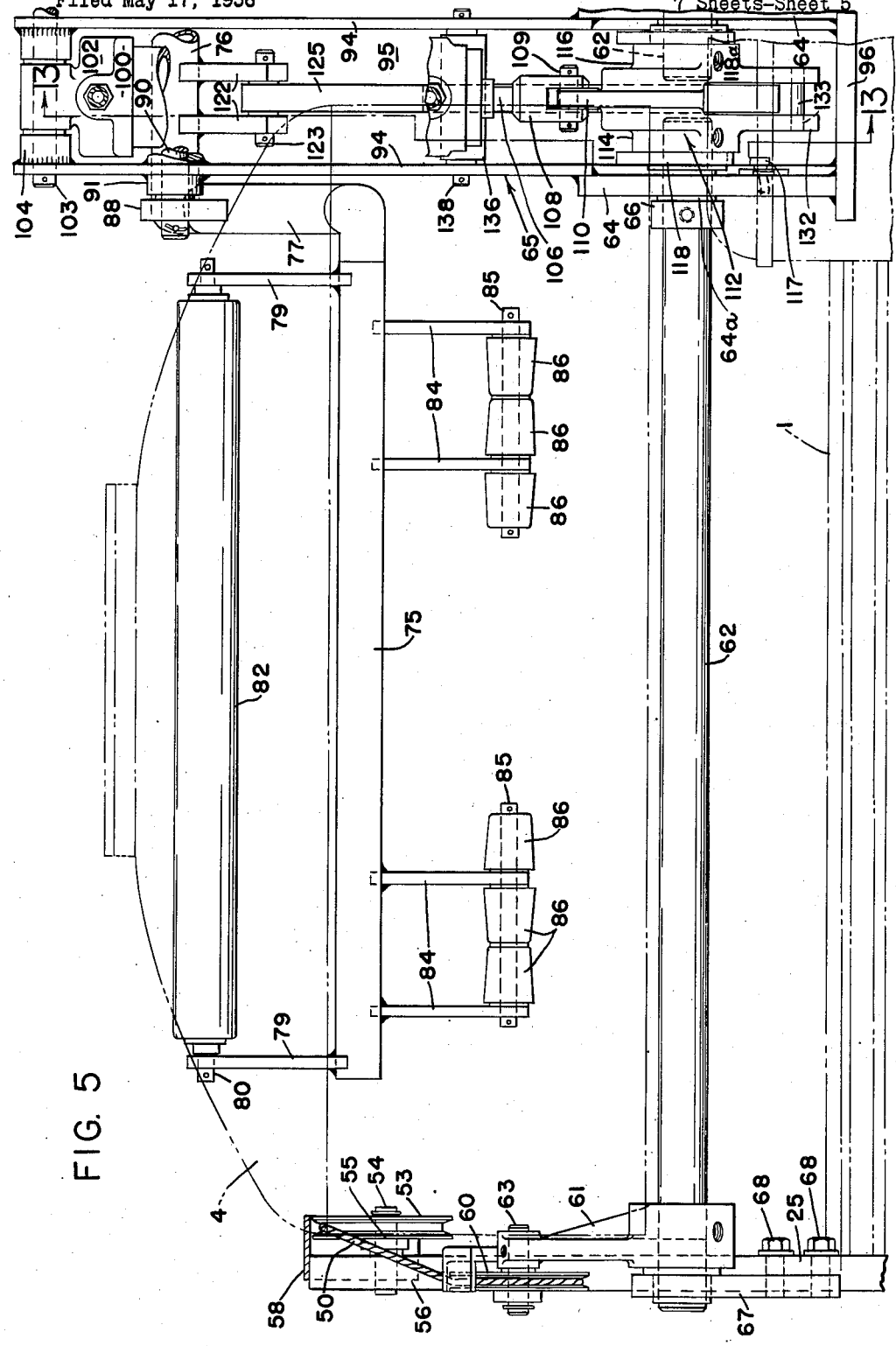

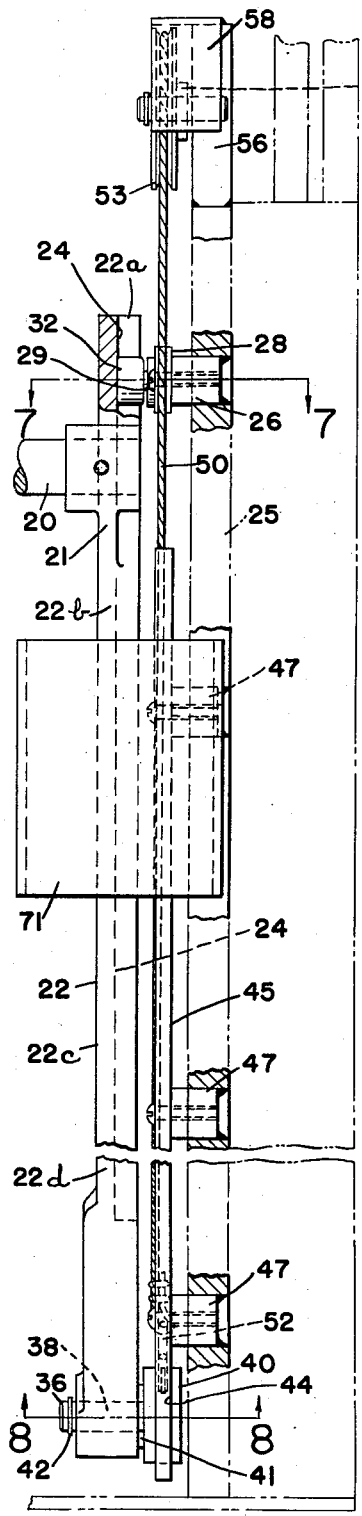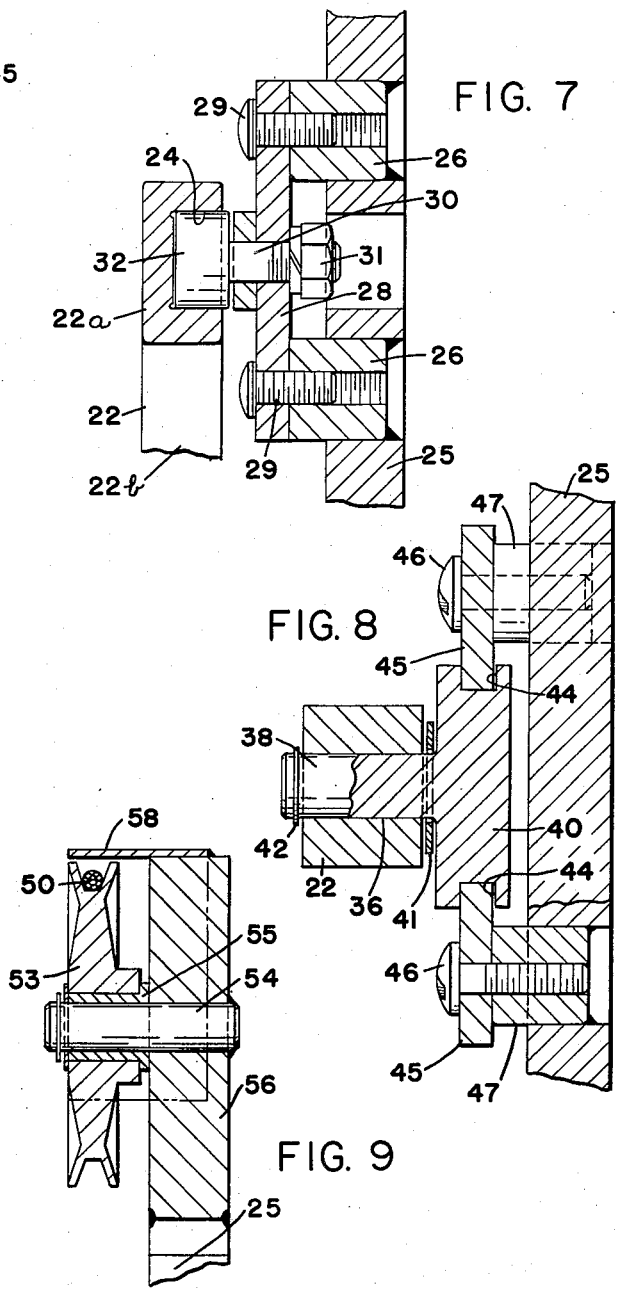

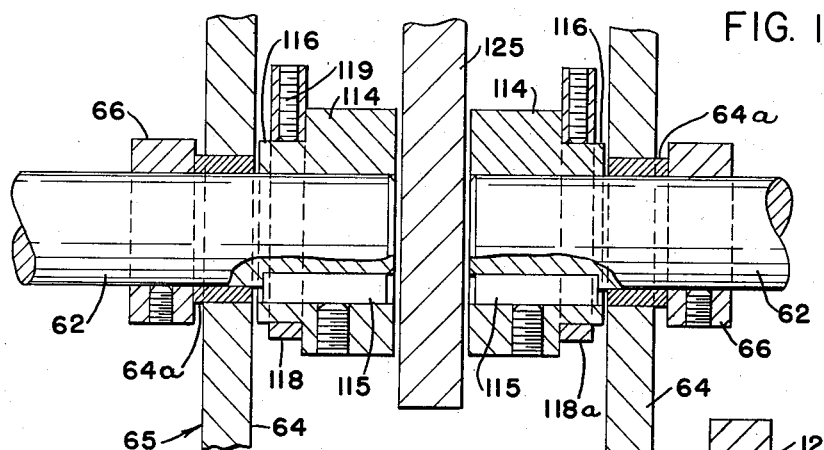
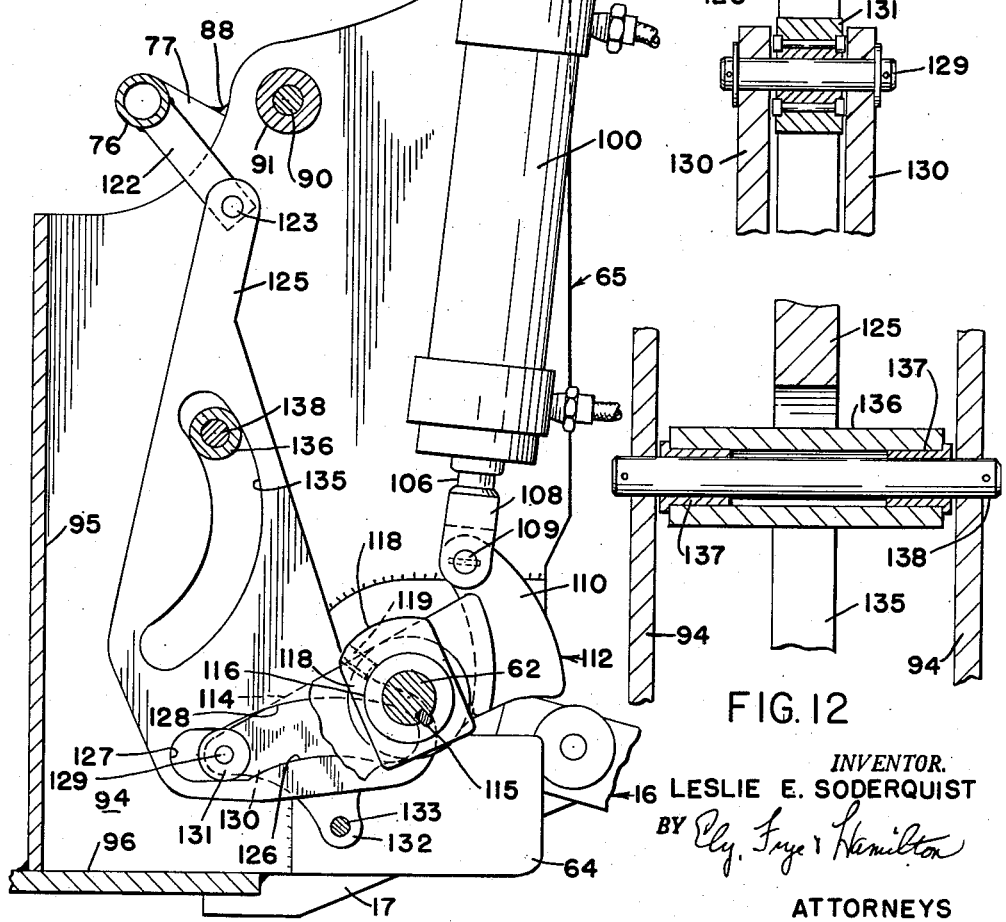
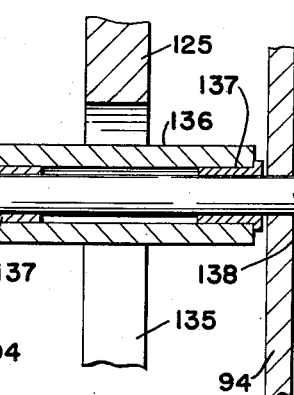

United States Patent Office 2,832,992
Patented May 6, 1958

2,832,992

MECHANISM FOR REMOVING CURED TIRES FROM TIRE CURING PRESSES

Leslie E. Soderquist, Silver Lake, Ohio, assignor to The McNeil Machine & Engineering Company, Akron, Ohio, a corporation of Ohio Application May 17, 1956, Serial No. 585,522

14 Claims. (Cl. 18—2)

The present invention relates to apparatus for removing cured tires from vulcanizing presses.

While the device is illustrated in the drawings in connection with presses of the type in which the tire is shaped and vulcanized on a diaphragm which is a permanent part of the press, the diaphragm type of shaping device is not an essential part of the mechanism and may be replaced by any other forming mechanism. For example, in the curing of tubeless tires in which it has been found possible to shape and cure without the use of a diaphragm or air bag and with the shaping and curing medium in direct contact with the tire, mechanisms have been devised for holding the tire during the curing operation by rings or the like acting on the inner surfaces of the beads. It will be understood that where the broader term "forming mechanism" is used in the specification and claims it is intended to cover not only a diaphragm type of curing press but also that type of press in which the forming of the tire is done by fluid pressure applied directly to the inner surface of the tire.

The start and return of the stripping arms and the various steps by which they move are controlled by electrical circuits which are not illustrated because the design thereof would be well within the skill of a qualified electrician, once the requirements are made known.

The mechanism shown herein may be used in presses into which the uncured bands are placed over the forming mechanism by manual operation, or the mechanism may be a part of a completely automatic loading and unloading apparatus such as shown in applicant's copending application Serial No. 567,555, filed February 24, 1956. Application Serial No. 567,555 also describes certain of the control mechanism and reference may be had to the said application.

The type of mechanism employed to open and close the press is immaterial to this invention. There is shown that type of press operating mechanism in which the upper mold section is moved in a vertical path during the last part of the closing movement and the first part of the opening movement, and during the balance of the press operation the upper mold section is pivoted to clear the space above the forming mechanism and the cured tire. Presses of this type have been perfected by the present applicant and are shown in a number of patents. For the purpose of the present application the mechanism shown in applicant's prior application Serial No. 416,598, filed March 16, 1954, now Patent No. 2,808,618, dated October 8, 1957, has been selected. It is also possible to use presses in which the movable mold section travels in a straight line during the entire opening and closing movements.

The drawings and description include an expansible diaphragm of the type shown in many of applicant's prior patents, such, for example, as that shown in Patent No. 1,715,245, dated August 16, 1955, but the specific type of diaphragm is not essential as any other form of diaphragm may be employed.

The present invention has nothing to do with the manipulation of the diaphragm in the shaping of the uncured band. However, in the form of the invention shown herein the cured tire is lifted out of the lower mold section by the elevation of the diaphragm while it is within the tire, and during the raising of the cured tire the stripping arms pass beneath the tire and by moving concurrently with the elongation of the diaphragm assist in the separation of the diaphragm from the tire. The elongated diaphragm is then returned to its seat in the lower mold section, whereupon the stripping mechanism completes its cycle and ejects the cured tire from the press, and then returns to its idle position.

The invention shown and described herein is in the nature of an improvement over the mechanism for removing cured tires from presses described in applicant's prior application Serial No. 525,844, filed August 2, 1955. It is the purpose of the present invention to improve upon and simplify the previously designed mechanism for operating the tire elevating and discharging arms.

In the particular embodiment of the invention which is shown herein, the tire removing mechanism is adapted to a dual press, i. e., one in which two molds are used concurrently, but it will be understood that the mechanism is equally well adapted to a single tire press and, except where necessary, the description will be confined to one side of the press only.

In the form of the invention shown the tire is discharged at the rear of the press, but the mechanism may be reversed if a front-discharging device is desired. It is to be understood, therefore, that the terms "front" and "rear" as applied to the stripping arms in the specification and claims are relative only.

The mechanism shown and described herein is the best known and preferred form of the invention as it was developed for the purpose and is subject to improvement and modification within the scope of the several claims appearing herein.

In the drawings:

Fig. 5 is a rear elevation of one side of a dual press showing the rear stripping arm at its lowered position. The position of this view is indicated by the section line 5—5 on Fig. 1.

Fig. 6 is a view looking at one of the front stripping arms, this view being taken on the line 6—6 of Fig. 2.

Fig. 7 is a section on the line 7—7 of Figs. 2 and 6.

Fig. 8 is a section on the line 8—8 of Fig. 6 through the guide block for one of the front stripping arms.

Fig. 9 is a section on the line 9—9 of Fig. 2, through the front sheave for the front stripper arm cable.

Fig. 10 is a section on the line 10—10 of Fig. 2 looking in the direction of the arrows.

Fig. 11 is a section on the line 11—11 of Fig. 2.

Fig. 12 is a section on the line 12—12 of Fig. 2.

Fig. 13 is a vertical section through the housing on the line 13—13 of Fig. 5.

Figure 1:
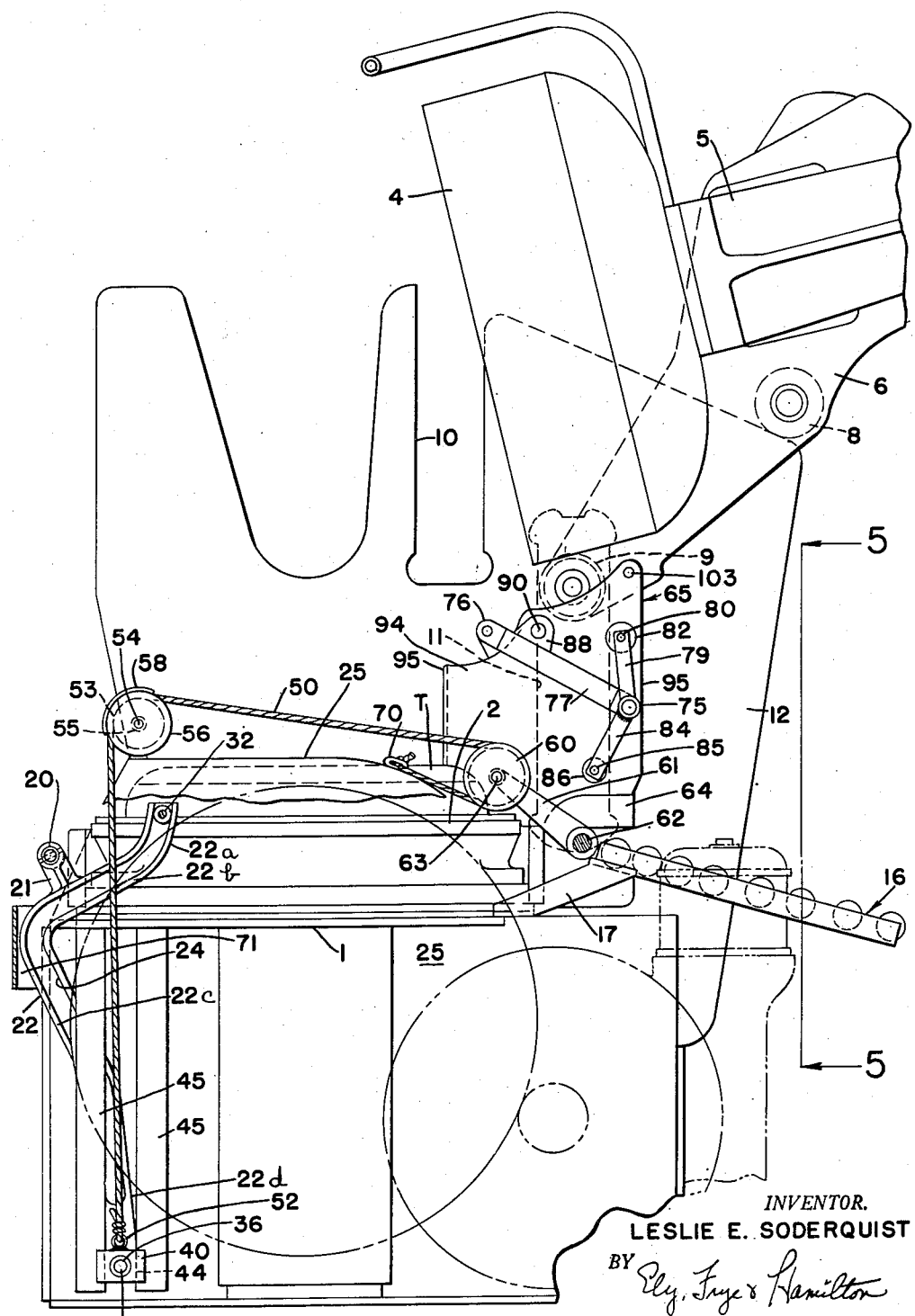
Fig. 1 is a side elevation of a press of the type described in which the upper mold section is raised, as at the end of the curing operation, and the vulcanized tire is resting in the lower mold section.

In the drawings, the bed of the press is indicated at 1 and located thereon is the lower mold section 2, which may be chambered for the circulation of steam. The upper chambered mold section 4 is carried by the cross head 5. The cross head is raised and lowered by mechanism such as shown in prior Patent No. 2,808,618, the outlines of the frame and certain operating parts being shown in dotted lines in Figs. 1-6. As shown in Fig. 1, the cross head is carried by a pair of plates 6 at either side of the press. The plates 6 are supported and guided by rollers 8 and 9 which move in slots 10 and 11, respectively, in side plates 12 attached to the bed of the press. The cross head is raised and lowered by link mechanism as shown in the aforesaid application so that during the latter part of the closing movement and the first part of the opening movement the two mold sections are kept in parallelism, while, during the balance of the movement a rocking motion is generated by the movement of rollers 8 over the backwardly inclined upper edges of the plates 12.

Figure 3:
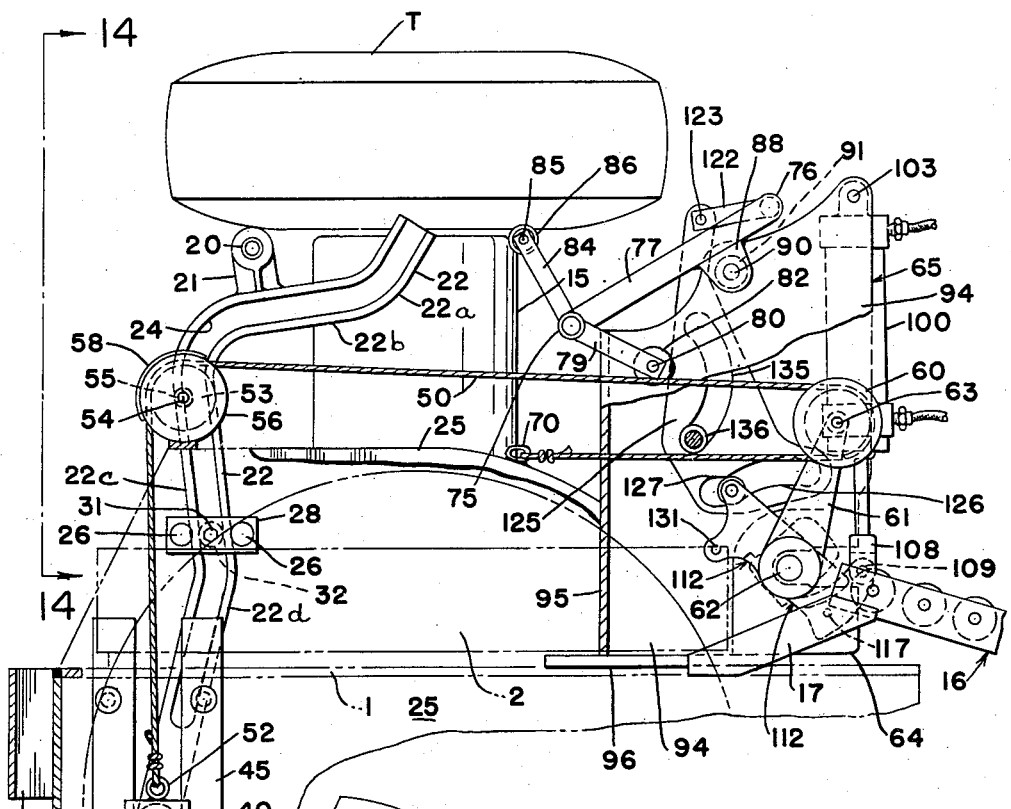
Fig. 3 shows the cured tire as it is raised and momentarily held in an intermediate position at the top of the extended diaphragm, which has been returned to its position in the lower mold section.
Figure 14:
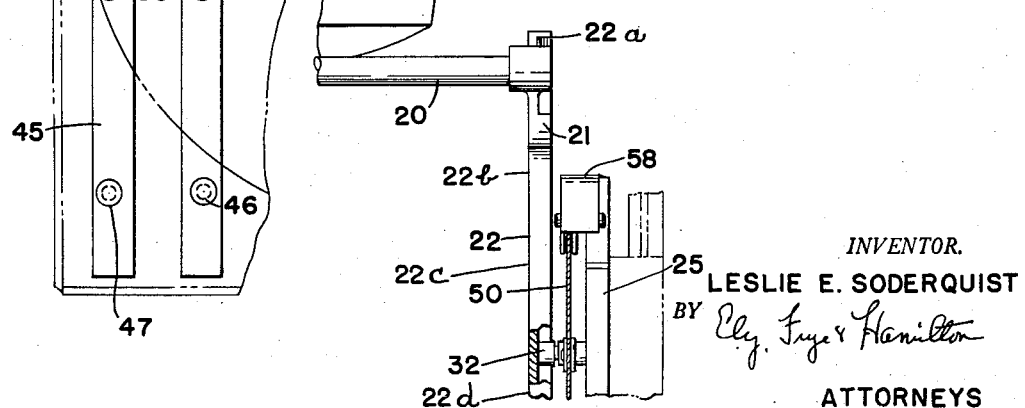
Fig. 14 is a view looking at the front of the press and showing the cured tire in position on the front stripper arm. This view is on the line 14—14 of Fig. 3.
Figure 4:
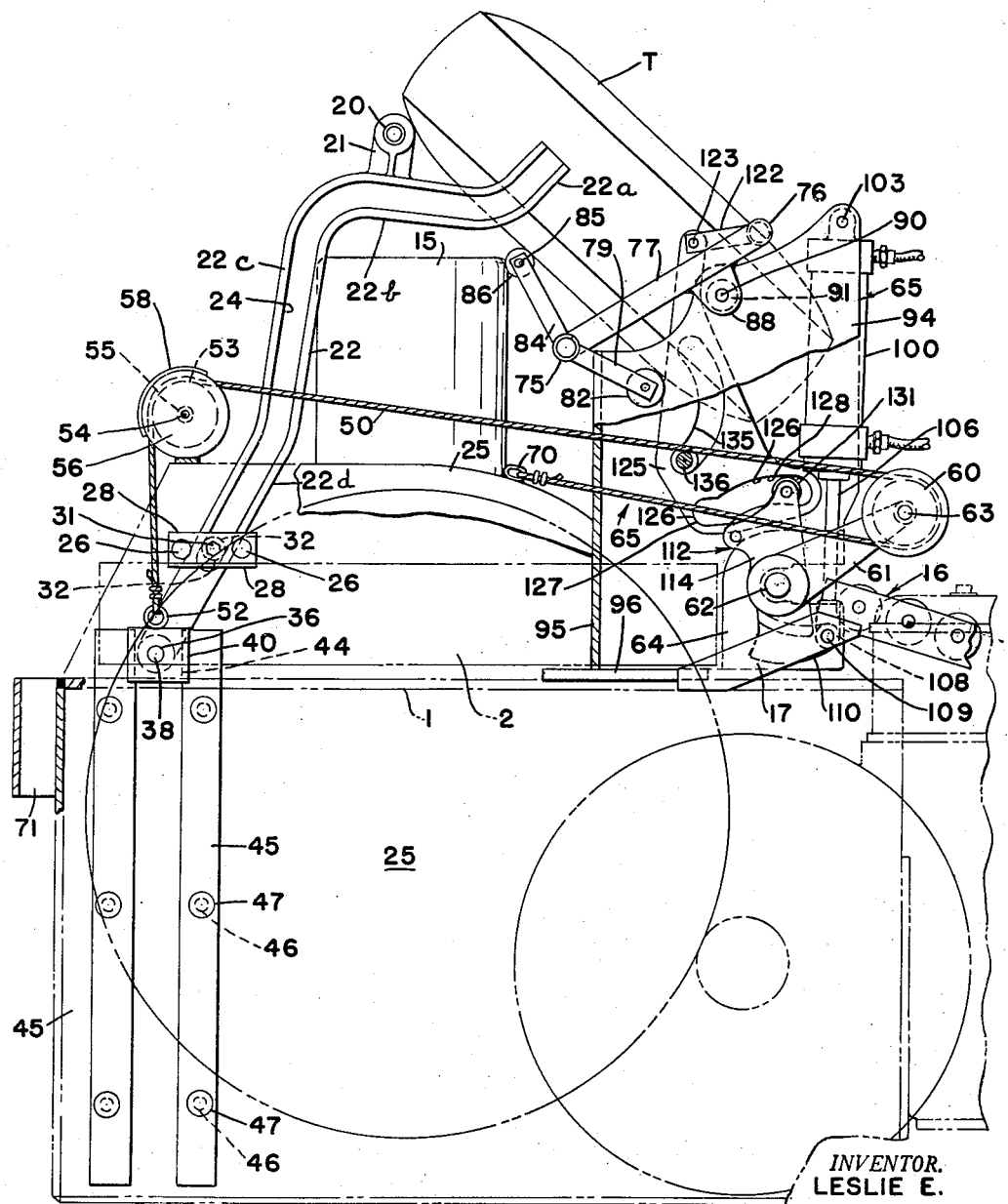
Fig. 4 shows the stripping mechanism at the end of its tire-discharging movement with the tire in tilted position and about to leave the press by gravity.

The forming mechanism which is shown here as the diaphragm 15 is actuated by any suitable type of mechanism well known in the art, and such, for example, as shown in applicant's prior Patent No. 2,715,245. In Fig. 1 the diaphragm is located within the vulcanized tire T, the press having just opened. The diaphragm is then raised to strip the cured tire from the lower mold section, the stripping arms are moved beneath the tire and along the side of the diaphragm, and the edges of the diaphragm separated, which extends the diaphragm. The extension of the diaphragm with the aid of the tire stripping mechanism draws the diaphragm out of the tire. When the diaphragm is fully extended it is lowered into position ready to receive a new tire band, as shown in Figs. 3 and 4.

On the rear side of the press is an off-bearing conveyor, indicated generally by the numeral 16, which is preferably of the gravity roller type and is carried by brackets 17 attached to the frame of the press.

*The front stripping or unloading arm*

The tire stripping mechanism consists of two arms which, when idle, are located in lowered position at either side of the lower mold section. The front stripper arm, or what may be termed the unloading arm, because it is the arm which is mainly instrumental in moving the cured tire out of the press, is located, when in idle position, below the level of the lower mold section so that it does not interfere with the loading of the press by the operator, if the press is to be manually loaded, nor with changing of molds.

As shown herein, the front stripper arm is a long, horizontal, steel tubing 20 which extends across the front of the press, being mounted at its ends in brackets 21 which project from the upper side of long rail-like arms 22 located on either side of the press. These arms 22 may be conveniently designated as cam rails and are oppositely faced and each is formed with a reverse or S-like curvature so that the stripper bar 20 is guided to follow the particular path which is essential to proper stripping and removal of the tire. As shown in the several main views and with particular reference to Figs. 1 and 2, where the cam rail 22 is idle, it is formed at its upper end with a short, outwardly inclined section 22a joined to a second section 22b at somewhat more than 90° thereof. It is on the upper side of this section that the bracket 21 is located. From the section 22b the arm is provided with a comparatively long inclined section 22c and terminates in a substantially vertical section 22d.

On the outer face of each cam rail 22 and extending from the upper end thereof to a point near the lower end, is an open channel 24 which serves as a cam track to guide the cam rail in its upward and downward movements. At each side of the press and located on the base is a side plate 25 in which are welded two plugs 26 (Fig. 7), across which is a plate 28 held on the plugs by bolts 29. In the center of the plate 28 is a stub shaft 30 held in position by a locknut 31. On the outer end of shaft 30 is a roller 32 which is located in the channel 24 and which, by following the cam surfaces thereof, guides the cam rail 22 in its movements.

The lower end of each cam rail 22 is enlarged and located therein is a bearing 36 in which is rotatably mounted a stub shaft 38 which projects outwardly from a carriage 40. A washer 41 and a lock ring 42 hold the lower end of the arm or cam rail in position on the shaft 38 (Fig. 8). The carriage 40 is a block, the side edges of which are formed with channels 44 which slidably engage the opposed edges of spaced vertical rails 45 which are secured by bolts 46 in lugs 47 located at intervals along the side plate 25.

The carriage 40, and with it the arm 22, is raised and lowered by mechanism to be described and as it does so both arms are rocked about the stub shafts 38 so that the stripper bar 20 follows the prescribed path. The successive positions of the stripper bar 20 after it leaves its idle position are shown by the dotted circles $p^1$ to $p^{10}$ in Fig. 2. It will be seen that in going from $p^1$ to $p^3$ the bar is brought beneath the tire, which has at that time been raised by the diaphragm so that it is clear of the lower mold section, the path described enabling the bar to clear the front upper edge of the lower mold section. From position $p^3$ to $p^6$, the stripper bar is moving upwardly paralleling the face of the diaphragm which has, during this interval, been extended and stripped from the tire. At the same time, the rear stripper arm or conveyor arm has been moved upwardly, as will be described, so that the tire is supported in the horizontal position shown in Fig. 3 at the top of the diaphragm. At this point it is desirable to have a slight pause in the movement of the stripper arms to allow the diaphragm to drain and return to its idle or inactive position, as shown in Figs. 3 and 4. The pause is created by a cam, to be described, which actuates an electrical switch which operates a valve that shuts off the hydraulic power to the arm lifting mechanism.

When the diaphragm reaches its lowered position it actuates a switch on the base of the press (not shown) which opens the valve and restores power to the arm lifting mechanism, whereupon the front stripper arm resumes its upward movement, which passes it through the positions $p^7$ to $p^{10}$. It is essential that the front stripper arm be retarded so as to enable the diaphragm to move out of its path; otherwise, the stripper arm would strike the diaphragm.

Figure 2:
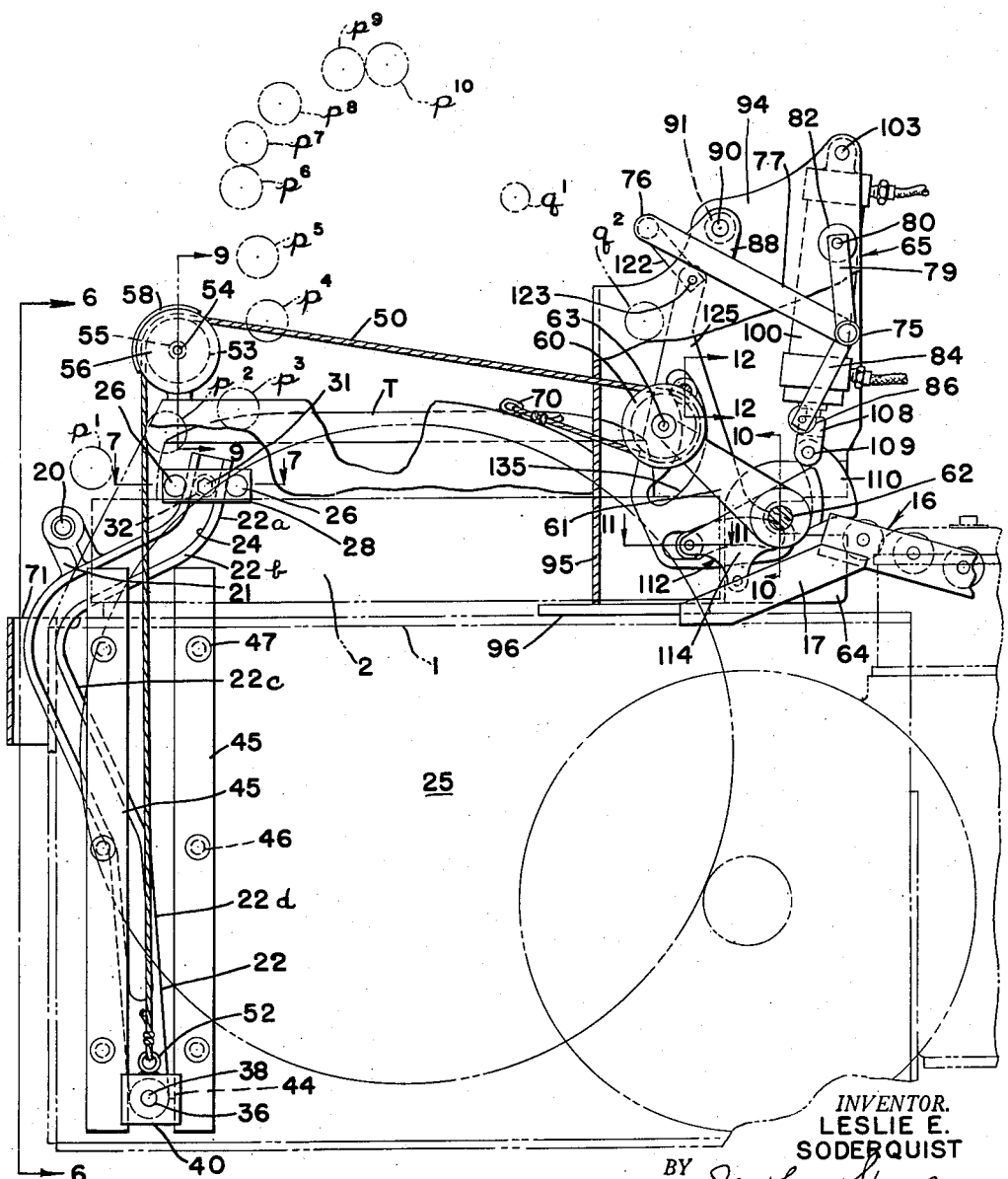
Fig. 2 is a similar view in which portions of the housing for the operating mechanism are removed to disclose the position of the parts when the stripping arms are in lowered or idle position.

As shown in Figs. 2 and 4, it will be seen that, due to the configuration of the cam track 24, the bar 20 will pass over and across the top of the lowered diaphragm and will push the tire upwardly and backwardly, which causes it to assume the tilted position at about 45° to the horizontal while the other side of the tire is supported by the rear stripping or conveying arm. The upward and backward movement of the arm 20 assists in propelling the tire out of the press. When the arm 20 reaches the top of its movement a second cam, to be described, actuates a switch which, after a short delay to enable the tire to clear the arms, reverses the power to the arm lifting mechanism and returns both arms to their idle position.

The elevation of the cam rails 22 during the first part of the upward movement is concurrent with the movement of the rear stripper arm, but during the latter part of the stripping operation the rear stripper arm is stationary and provides the upper part of a gravity conveyor over which the vulcanized tire T passes onto the conveyor 16 and out of the press.

Mechanism which is shown herein to operate the front stripper arm consists of two ropes or cables 50, the lower and outer end of each of which is connected to an eye bolt 52 which is threaded into the upper side of the carriage 40. The cable 50 passes over a sheave 53 which is rotatably mounted on a bearing sleeve 55 on a pin 54 welded in a bearing block 56 which in turn is welded to the upper edge of the side plate 25 (Fig. 9). A curved guard 58 is located over the upper part of the pulley.

From the pulley 53 the cable 50 passes to and around a movable pulley 60, which is rotatable upon a pin 63 on the outer end of a rocking arm 61 which is fixed to the outer end of a long rock shaft 62 located at the rear of the press. In a dual press there are two of these shafts 62, in alignment, one shaft serving each unit (see Figs. 5 and 10). The inner end of each shaft is rotatably mounted in a bearing sleeve 64a mounted in a plate 64 forming the lower part of a housing, indicated generally by the numeral 65, for the operating mechanism of the two units. A collar 66 is mounted on the inner end of each shaft 62 abutting each sleeve 64a and the outer end is supported in a bearing plate 67 secured by bolts 68 to the upper edge of the side plate 25.

From the pulley 60 the cable is looped upon itself and the end thereof is anchored to an eye 70 carried on the upper edge of the side plate 25. The pulleys 60 travel over an extensive arc, as shown by comparing the position shown in Fig. 1 with that in Fig. 4, and this movement raises and lowers the carriages 40 and the arms carried thereby. It is desirable to locate a guard plate 71 at the front of the press to shield the arm 22.

The rear stripping or conveying arm

The rear stripping arm somewhat resembles a cradle and has a rocking movement over an arc of approximately 90°, which moves it from an idle, lowered position at the rear of the press, as shown in Figs. 1 and 2, to a raised position shown in Figs. 3 and 4. At the upward limit of its movement, the upper side of the cradle is at the level which the forward stripping arm assumes when in the $p^6$ position of Fig. 2, this being shown by the dotted circle $q^1$ in Fig. 2. The other or lower side of the cradle occupies the position shown by the dotted circle $q^2$. In this tilted position the cradle is held while the front stripping arm continues its upward movement and as the cradle, as a whole, is inclined downwardly the tire passes out of the press and onto the conveyor 16, as has been described.

Mechanism which will be described moves both arms jointly to the intermediate position shown in Fig. 3 and then both stripping arms are halted momentarily by the switch heretofore referred to, and thereafter the diaphragm on reaching its lowered position causes the front stripper arm to complete its movement. When the front stripper arm reaches the upper limit of its movement, the second switch returns both arms to lowered positions.

The main body of the rear stripper arm is formed by a long composite shaft, which in a dual press extends across the entire press. At each side of the press the shaft is a long horizontal tubular bar 75, the two bars being connected to a central offset tubular portion 76 by right angular branches 77. This forms a unitary element having a centrally located U-shaped section which constitutes a crank by which the whole arm is rocked. To one side of each bar and at the ends thereof are welded two parallel arms 79, in the outer ends of which is a transverse shaft 80, on which is rotatably mounted a long roller 82. To the opposite side of each bar 75 are welded pairs of arms 84, and in the outer ends of each pair of arms is a shaft 85 on which are journaled the freely rotatable rollers 86, three being shown in each group. The rollers are arranged in groups so as to clear the diaphragm.

To one side of each arm 77 is welded a bracket 88 and these two brackets are keyed to a shaft 90 which is rotatably mounted in a long sleeve 91 which extends through and is welded to the parallel vertical walls 94 which constitute the sides of the housing 65. The front of the housing is formed by a vertical plate 95 and the housing, including the lower plates 64, is mounted on a base plate 96 which is secured to the bed plate of the press.

The shaft 90 forms the axis about which the rear stripper arm rocks. The mechanism which will now be described actuates both stripper arms.

The power to do this work is derived from a reversible hydraulic cylinder 100, the flow of pressure to and from the cylinder being controlled by valves which are operated by switches which are controlled by movable parts of the press. Thus, when the diaphragm has lifted the cured tire out of the press, a limit switch may be operated which moves both stripping arms upwardly to their intermediate position, when a switch will be operated which temporarily shuts off admission of pressure to the cylinder. All of the controls, the piping and the valves may be designed by a capable mechanic and need not be described.

The operating mechanism for the stripping arms

There is a single operating mechanism for both the front and rear stripping arms on both sides of the press. The power cylinder 100, to which reference has been made, is carried by a saddle 102 which is journaled on a pin 103 mounted in bearings 104 welded to the upper, inside surface of the plates 94. The lower end of the piston rod 106 is connected to a clevis 108, which is pivoted at 109 to a centrally located wing 110 of a bell-crank lever, indicated generally by the numeral 112. The bell-crank lever 112 is formed with two parallel wings 114 which are received over the inner opposed ends of the two shafts 62 within housing 65 and to each of which the bell-crank lever is fixed by the keys 115 as shown in Fig. 10. It will be seen that during the full stroke of the cylinder 100 the shafts 62 are rotated, thus rocking the arms 61 and raising and lowering the front stripper arms during the whole of the cycle of the tire removing mechanism. On each wing 114 is a hub 116, on which are mounted cam plates 118 and 118a held in place by set screws 119. One of the cams, say 118, operates an arm delay switch 117 (Fig. 5) located on the inner face of the adjacent plate 64 which initiates the delay at the intermediate position of the stripping arms. The other cam 118a operates another switch (not shown) which is located on the other plate 64 which returns the arms at the end of the stripping operation.

As explained, it is necessary that the rear stripper arm be raised only during the first part of the cycle and held in that position during the balance of the cycle, until the front stripper arm returns to the intermediate position after unloading the tires. The operation of the rear stripper arm is through the bell-crank lever 112, as will now be explained.

Welded to the central or crank portion 76 of the rear stripper arm are two spaced arms 122, through the outer ends of which is passed a pin 123. The pin 123 connects the rear stripper arm to an intermediate link-plate 125, best shown in Fig. 13. The part 125 is a long, fan-shaped plate, the lower end of which is provided with a cam slot 126. This cam slot has a section 127 which is substantially straight, and a section 128 which is arcuate and so formed that during the latter portion of the cycle that section of the cam slot is an arc of a circle having as its center the axis of the shaft 62. The bell-crank lever is provided with two parallel arms 130 and across the outer ends of the two arms 130 is a pin 129, on which is mounted a roller bearing for a cam roller 131 which moves in the cam track 126. Formed in the central portion of the link plate 125 is an arcuate slot 135, and movable in this slot is a guide roller 136 mounted on bushings 137 carried on a pin 138 which is held in the plates 94 of the housing (Fig. 12).

Operation

When the stripping arms are in their lowermost position, as shown in Fig. 2, the roller 136 is at the upper end of the slot 135 and the roller 131 is in the outer end or straight section 127 of the cam slot 126 and the piston rod 106 is retracted. Fluid pressure admitted to the upper end of the cylinder 100 will rock the shaft 62 in the clockwise direction which, through the shifting of the pulley 60, will raise the arms 22 and the front stripper bar 20. During the first part of this movement and until the bar 20 reaches its intermediate position, the roller 131 is moving in the part 127 of the cam slot 126, which raises the link plate 125 in a substantially vertical direction as the roller 136 moves in the slot 135. When the roller 136 reaches the lower end of the slot 135, the rear stripper arm is at the top of its movement because of the connection between the link plate 125 and the arms 122.

When the roller 136 reaches the lower end of the slot 135, the parts are in the position shown in Fig. 3 and at this point the roller 131 moves into the arcuate portion 128 of the cam slot 126. The result is that while the shaft 62 continues to rotate (after the short drainage interval and the lowering of the diaphragm) and the front stripper arm continues to rise, the roller 131 holds the link plate 125 elevated and no movement is imparted to the rear stripper arm. The switch described now reverses the cylinder 100 and the arms return to idle position. Should by any chance the tire stop at the upper end of the gravity conveyor 16, the roller 82 will, on the return movement of the cradle, give the tire a kick and start it down the conveyor.

The tire removing mechanism is started in motion automatically when the diaphragm has lifted the tire out of the lower mold section and this may be controlled by a limit switch actuated by the diaphragm mechanism.

Conclusion

It will be seen that a distinctively novel and useful improvement has been made in the operation of the tire removing mechanism and, while the drawings and description have been quite detailed, the invention is not to be considered as restricted to the details set forth.

What is claimed is:

1. In a press for shaping and curing tires in sectional molds comprising a lower mold section, a tire band shaping and forming mechanism located in the press, means to elevate a cured tire above the lower mold section, a tire stripping arm at one side of the forming mechanism, a cam track associated with said arm, means to move said arm, said cam track being designed and adapted to guide said arm beneath the cured tire after it has been elevated above the lower mold section and then upwardly and over the top of the forming mechanism.

2. In a press for shaping and curing tires in sectional molds comprising a lower mold section, a tire band shaping and forming mechanism located in the press, means to elevate a cured tire above the lower mold section, a tire stripping arm at one side of the forming mechanism, a cam track associated with said arm, means to move said arm, said cam track being designed and adapted to guide said arm beneath the cured tire after it has been elevated above the lower mold section upwardly along the forming mechanism and over the top of the forming mechanism, a second stripping arm on the other side of the forming mechanism, and means to move said second stripping arm during the movement of the first arm beneath the tire and upwardly along the forming mechanism but to delay the second stripping arm while the first arm is moving over the top of the forming mechanism.

3. In a press for curing tires in sectional molds comprising a lower mold section, a tire band shaping and forming mechanism located in the press, means to elevate a cured tire above the lower mold section, a tire stripping arm at one side of the mold section, a cam track associated with said arm, means to move said arm, said cam track being designed and adapted to guide said arm from its position at the side of the mold to a position beneath the cured tire after it has been elevated above the lower mold section and then upwardly along the forming mechanism and over the top of the forming mechanism, and a conveying device to receive the tire from the stripping arm and convey the tire out of the press.

4. In a press for shaping and curing tires in sectional molds comprising a lower mold section, a tire band shaping and forming mechanism located in the press, means to elevate a cured tire above the lower mold section, a tire stripping arm at one side of the forming mechanism, a cam track associated with said arm, means to move said arm, said cam track being designed and adapted to guide said arm beneath the cured tire after it has been elevated above the lower mold section upwardly along the forming mechanism and over the top of the forming mechanism, a second stripping arm on the other side of the forming mechanism, means to move said second stripping arm during the movement of the first arm beneath the tire and upwardly along the forming mechanism but to delay the second stripping arm while the first arm is moving over the top of the forming mechanism, and conveying means on the second stripping arm to conduct the cured tire out of the press.

5. A tire stripping means for use in a tire shaping and curing press having upper and lower mold sections and a tire shaping and forming mechanism, means to raise the cured tire from the lower mold section, a pair of cam rails, a tire stripping arm carried by the cam rails, means to raise and lower the cam rails, and guiding means on the press cooperating with the rails, said cam rails being shaped to guide the arm over the top of the lower mold section and beneath the cured tire and elevate the arm to raise the cured tire to the top of the forming mechanism and over the top of the forming mechanism.

6. A tire stripping means for use in a tire shaping and curing press having upper and lower mold sections and a tire shaping and forming mechanism, means to raise the cured tire from the lower mold section, a pair of cam rails, a tire stripping arm carried by the cam rails, means to raise and lower the cam rails, guiding means on the press cooperating with the rails, said cam rails being shaped to guide the arm over the top of the lower mold section and beneath the cured tire and elevate the arm to raise the cured tire to the top of the forming mechanism and over the top of the forming mechanism, a second tire-stripping arm located on the side of the forming mechanism opposite to the first arm, and means to move the second arm beneath the tire and upwardly to raise the cured tire to the top of the forming mechanism.

7. A tire stripping means for use in a tire shaping and curing press having upper and lower mold sections and a tire shaping and forming mechanism, means to raise the cured tire from the lower mold section, a pair of cam rails, a tire stripping arm carried by the cam rails, means to raise and lower the cam rails, guiding means on the press cooperating with the rails, said cam rails being shaped to guide the arm over the top of the lower mold section and beneath the cured tire and elevate the arm to raise the cured tire to the top of the forming mechanism, a second tire stripping arm located on the side of the forming mechanism opposite to the first arm, means to move the second arm to raise the cured tire to the top of the forming mechanism, and means to keep the second arm in raised position while the first arm moves over the top of the forming mechanism.

8. In a tire curing press having upper and lower mold sections, means to lift the cured tire from the lower mold section, a stripping arm at one side of the mold section and means to move the stripping arm beneath the tire after it has been lifted and to raise the stripping arm upwardly to lift the tire, a rock shaft, means to oscillate the shaft, a crank arm connected to the stripping arm, connections between the rock shaft and the crank arm including means to raise the stripping arm, said last named means including a part-time idling connection between the rock shaft and the crank arm to keep the stripping arm in raised position during a single stroke of the rock shaft, a second stripping arm at the other side of the mold section, and means operatively connected to the oscillating means to raise the second stripping arm during the entire movement of the rock shaft.

9. In a tire shaping and curing press having upper and lower mold sections, means to lift the cured tire from the lower mold section, a stripping arm at one side of the mold section and means to move the stripping arm beneath the tire after it has been lifted and to raise the stripping arm upwardly to lift the tire, a rock shaft, means to oscillate the shaft, a crank arm connected to the stripping arm, a lever on the rock shaft and a link attached to the crank arm, a cam connection between the link and the lever adapted to raise the stripping arm during the first part of the movement of the rock shaft and to delay the stripping arm during the second part of the movement of the rock shaft, a second stripping arm at the other side of the mold section, and means operatively connected to the oscillating means to raise the second stripping arm during the entire movement of the rock shaft.

10. In a tire shaping and curing press having upper and lower mold sections, a tire forming mechanism in the press and means to lift the cured tire from the lower mold section, a stripping arm at one side of the forming mechanism and means to move the stripping arm beneath the tire after it has been lifted and to raise the stripping arm upwardly to lift the tire, a rock shaft, means to oscillate the shaft, a crank arm connected to the stripping arm, connections between the rock shaft and the crank arm including means to raise the stripping arm, said last named means including a part-time idling connection between the rock shaft and the crank arm to keep the stripping arm in raised position during a single stroke of the rock shaft, a second stripping arm on the other side of the forming mechanism, and means actuated by the rock shaft to raise the second stripping arm during the entire movement of the rock shaft.

11. In a tire shaping and curing press having upper and lower mold sections, a tire forming mechanism in the press and means to lift the cured tire from the lower mold section, a stripping arm at one side of the forming mechanism and means to move the stripping arm beneath the tire after it has been lifted and to raise the stripping arm upwardly to lift the tire, a rock shaft, means to oscillate the shaft, a crank arm connected to the stripping arm, a lever on the rock shaft and a link attached to the crank arm, a cam connection between the link and the lever adapted to raise the stripping arm during the first part of the movement of the rock shaft and to delay the stripping arm during the second part of the movement of the rock shaft, a second stripping arm on the other side of the forming mechanism, and means actuated by the rock shaft to raise the second stripping arm during the entire movement of the rock shaft.

12. In a tire shaping and curing press having upper and lower mold sections, a tire forming mechanism in the press and means to lift the cured tire from the lower mold section, a stripping arm at one side of the forming mechanism and means to move the stripping arm beneath the tire after it has been lifted and to raise the stripping arm upwardly to lift the tire, a rock shaft, means to oscillate the shaft, a crank arm connected to the stripping arm, connections between the rock shaft and the crank arm including means to raise the stripping arm and then to keep it in raised position during a single stroke of the rock shaft, a second stripping arm on the other side of the forming mechanism, and a cable hoist attached to the second stripping arm and operative connections between the rocker arm and the cable hoist to raise and lower the second stripping arm.

13. In a tire shaping and curing press having upper and lower mold sections, a tire forming mechanism in the press and means to lift the cured tire from the lower mold section, a stripping arm at one side of the forming mechanism and means to move the stripping arm beneath the tire after it has been lifted and to raise the stripping arm upwardly to lift the tire, a rock shaft, means to oscillate the shaft, a crank arm connected to the stripping arm, a lever on the rock shaft and a link attached to the crank arm, a cam connection between the link and the lever adapted to raise the stripping arm during the first part of the movement of the rock shaft and to delay the stripping arm during the second part of the movement of the rock shaft, a second stripping arm on the other side of the forming mechanism, and a cable hoist attached to the second stripping arm and operative connections between the rocker arm and the cable hoist to raise and lower the second stripping arm.

14. In a tire shaping and curing press having upper and lower mold sections, a tire forming mechanism in the press and means to lift the cured tire from the lower mold section, a stripping arm at one side of the forming mechanism and means to move the stripping arm beneath the tire after it has been lifted and to raise the stripping arm upwardly to lift the tire, a rock shaft, means to oscillate the shaft, a crank arm connected to the stripping arm, connections between the rock shaft and the crank arm including means to raise the stripping arm and then to keep it in raised position during a single stroke of the rock shaft, a second stripping arm on the other side of the forming mechanism, means actuated by the rock shaft to raise the second stripping arm during the entire movement of the rock shaft, and cam means associated with the second stripping arm to guide it beneath the cured tire and upwardly during the entire movement of the rock shaft.

References Cited in the file of this patent

UNITED STATES PATENTS

| | | |
|---|---|---|
| 1,925,995 | De Mattia | Sept. 5, 1933 |
| 2,715,245 | Soderquist | Aug. 16, 1955 |

UNITED STATES PATENT OFFICE
CERTIFICATE OF CORRECTION

Patent No. 2,832,992                        May 6, 1958

Leslie E. Soderquist

It is hereby certified that error appears in the printed specification of the above numbered patent requiring correction and that the said Letters Patent should read as corrected below.

Column 1, line 70, for the patent number "1,715,245" read -- 2,715,245 --; column 2, lines 3 and 4, for "hereing" read -- herein --.

Signed and sealed this 15th day of July 1958.

(SEAL)

Attest:

KARL H. AXLINE                                          ROBERT C. WATSON

Attesting Officer                                      Commissioner of Patents